United States Patent [19]
Agosta et al.

[11] Patent Number: 5,375,901
[45] Date of Patent: Dec. 27, 1994

[54] CONVERTIBLE TOP WITH FOLD-DOWN REAR WINDOW

[75] Inventors: Roy P. Agosta, Reseda; Mark R. Robbins, Pacific Palisades, both of Calif.

[73] Assignee: Robbins Auto Top Company, Inc., Santa Monica, Calif.

[21] Appl. No.: 141,392

[22] Filed: Oct. 22, 1993

[51] Int. Cl.⁵ ............................................... B60J 7/12
[52] U.S. Cl. ..................... 296/146.14; 296/125; 296/145
[58] Field of Search .................. 296/146.14, 145, 147, 296/107, 117, 125

[56] References Cited

U.S. PATENT DOCUMENTS

| Re. 34,033 | 8/1992 | Godette | 296/107 |
|---|---|---|---|
| 1,491,621 | 4/1924 | Pfander et al. | 296/125 |
| 2,708,137 | 5/1955 | Poelman | 296/107 |
| 3,096,117 | 7/1963 | Hallenbeck | 296/107 |
| 5,253,915 | 10/1993 | Schnader et al. | 296/107 |

Primary Examiner—Dennis H. Pedder
Attorney, Agent, or Firm—Kelly Bauersfeld & Lowry

[57] ABSTRACT

A convertible top for an automobile includes a rear window of glass or the like connected to the top by a track linkage adapted to guide the rear window between deployed and stored positions as the top is raised and lowered. The convertible top comprises a fold-down frame supporting a fabric top material, and defining a rear panel with a rear window opening therein. The rear window has a lower margin hingedly connected to the rear panel along a lower edge of the rear window opening. The track linkage includes a pair of track members disposed at the laterally opposite side edges of the rear window and slidably coupled to the rear panel to permit pivoting movement of the rear window within a plane which is independent of the rear panel as the convertible top is raised and lowered.

17 Claims, 3 Drawing Sheets

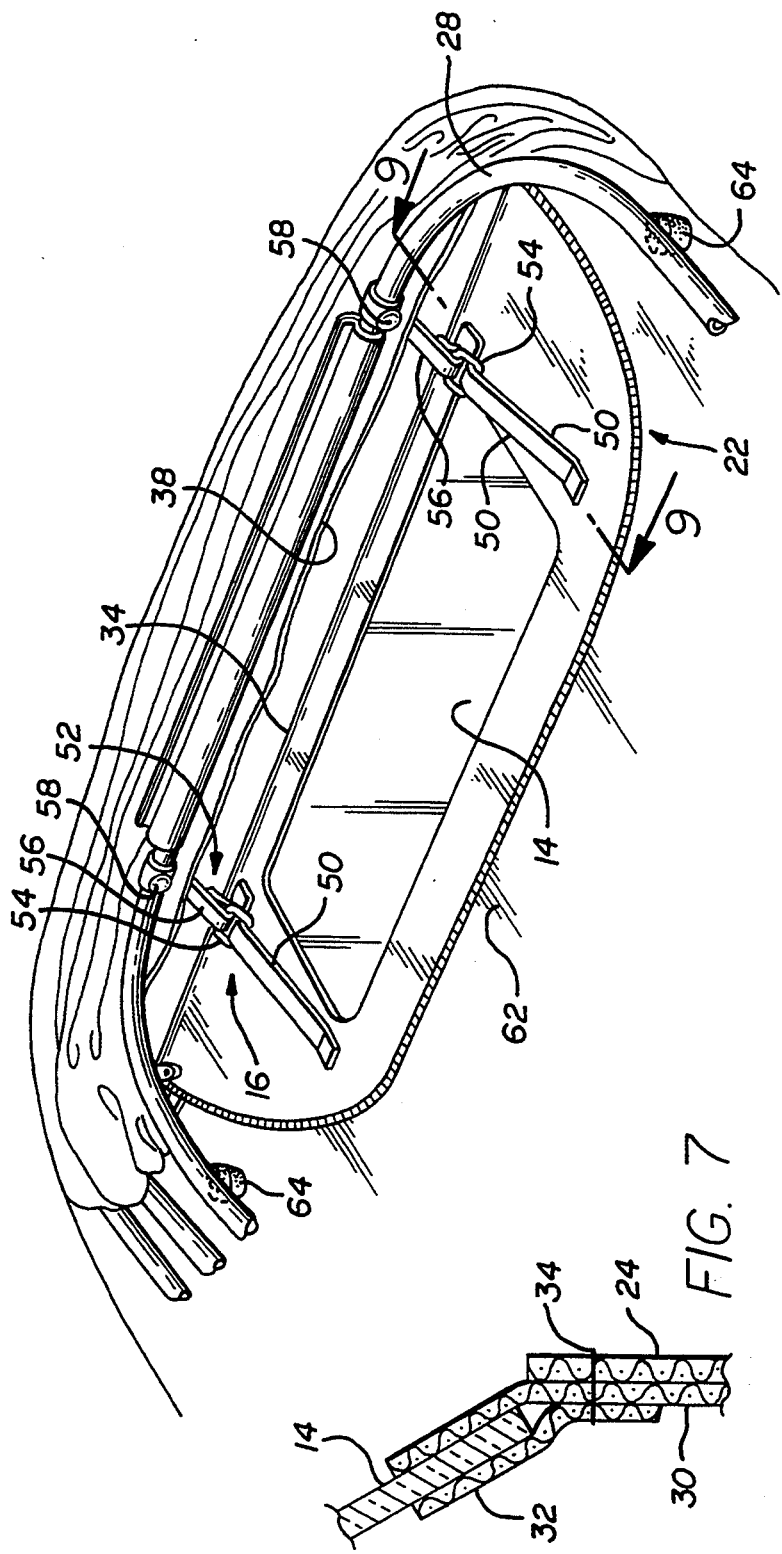

CONVERTIBLE TOP WITH FOLD-DOWN REAR WINDOW

BACKGROUND OF THE INVENTION

This invention relates generally to improvements in convertible tops for automobiles, particularly such as relatively compact roadsters and the like. More specifically, this invention relates to a convertible top adapted for fold-down movement for storage within a compact space, wherein the top includes a rear window of glass or the like to provide high quality visibility to the rear of the vehicle.

Automotive vehicles having a so-called convertible top are well-known in the art, wherein the vehicle is provided with a roof structure in the form of a fold-down frame which carries a flexible fabric-based top material. The convertible top is designed for relatively rapid deployment between a normal "up" or raised position to provide a roof structure covering a passenger compartment, and a "down" or lowered position with the top folded and stored behind passenger seats. In the raised position, the top protects vehicle occupants from rain, wind, and the like, whereas in the lowered position the vehicle occupants may enjoy direct exposure to fresh air, sunshine, etc.

Convertible tops for automotive vehicles have traditionally included a transparent rear window to accommodate visibility to the rear of the vehicle. In many instances, this rear window has been formed from a flexible plastic sheet material which, over time, tends to become brittle and cracked, and lose transparency due to exposure to climatic conditions. In addition, flexible plastic windows are often designed to fold with the top material, particularly in small or compact vehicles wherein there is minimal storage space to receive and store the convertible top in the "down" or lowered positioned. Such folding of the rear window tends to create optical distortions which restrict visibility when the top is in the raised position.

The use of a glass rear window in a convertible top is highly preferred, since a glass window provides superior rearward visibility which remains substantially unaffected by exposure to climatic conditions over time. However, a glass rear window is substantially rigid in construction and thus inherently poses significant limitations upon folding movement of the convertible top between the raised and lowered positions. In relatively large vehicles, glass rear windows have been used for many years since such vehicles normally provide adequate storage space for the convertible top in a lowered state. However, in smaller vehicles such as compact roadsters and sports cars, the limited available storage space for the folded convertible top has either precluded the use of a glass rear window, or has otherwise severely restricted the size of the rear window such that rearward visibility has been compromised.

There exists, therefore, a significant need for further improvements in automobile convertible tops, particularly of the type designed for small vehicles, wherein the convertible top includes a glass rear window of substantial size to provide high quality rearward visibility. The present invention fulfills these needs and provides further related advantages.

SUMMARY OF THE INVENTION

In accordance with the invention, an improved convertible top includes a fold-down rear window of glass or the like to provide high quality rearward visibility to vehicle occupants. The convertible top comprises an articulated fold-down frame supporting a flexible fabric-based top material for movement between a normal raised position defining a roof structure for the vehicle, and a lowered position for compact storage behind vehicle seats. The rear window is connected to the convertible top by means of a track linkage adapted to move the rear window between deployed and stored positions as the convertible top is raised and lowered.

The convertible top includes a rear panel defined by a portion of the top material extending between a rear edge of the convertible top and a rear bow comprising the rearmost frame component of the fold-down frame. The rear panel of the top is designed to fold upon itself as the top is moved from the raised position to the lowered position, thereby achieving a highly compact configuration of the top in the lowered position. A storage well formed within the vehicle at a position behind occupant seats receives the convertible top in the lowered position.

The rear window is mounted to the rear panel of the convertible top. More specifically, a lower margin of the rear window is hingedly connected to the rear panel along a lower edge of a rear window opening formed in the rear panel. The track linkage comprises a pair of track members extending along the opposite side edges of the rear window. The two track members are connected by slide members to the upper edge of the rear panel, as by connection to the rear frame bow of the fold-down frame. The slide members guide along the track members to permit fold-down movement of the rear window within a plane independent of the rear panel, as the convertible top is lowered. Similarly, the slide members function to raise the rear window to a deployed position, substantially coplanar with the rear panel and extending across the rear window opening, when the convertible top is moved to the raised position. Auxiliary fastener means is desirably provided for releasibly attaching an upper margin of the rear window to an upper edge of the rear panel, with a preferred fastener means comprising a zipper extending transversely across the convertible top.

In accordance with a further aspect of the invention, the track members can be detached from the rear panel to permit movement of the convertible top between the raised and lowered positions, without correspondingly moving the rear window between the deployed and stored positions. In this state, when the convertible top is raised, the rear window opening formed in the rear panel remains open for free air flow passage therethrough.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 7 is an enlarged fragmented vertical sectional view taken generally on the line 7—7 of FIG. 5;

FIG. 8 is an enlarged fragmented perspective illustrating the convertible top and rear window in a lowered state; and FIG. 9 is a fragmented sectional view taken generally on the line 9—9 of FIG. 8.

DETAILED DESCRIPTION OF THE PREFERRED EMBODIMENT

Figure 1:
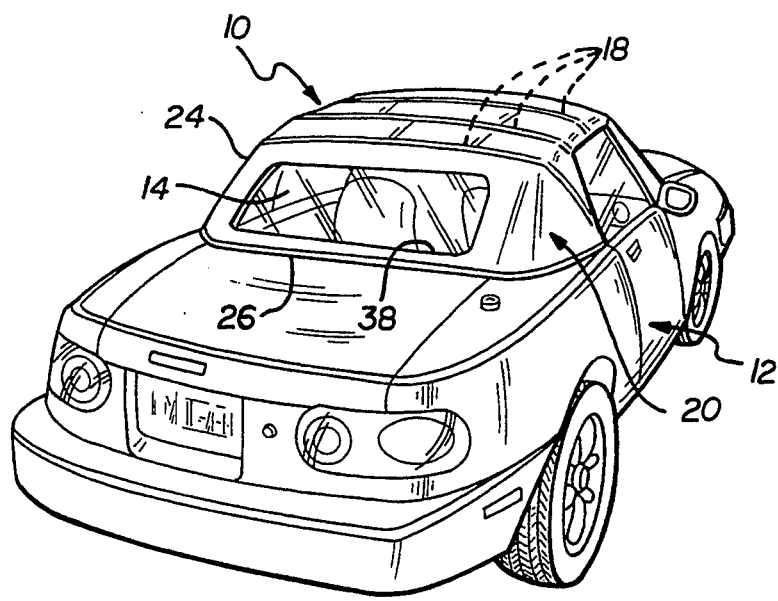
FIG. 1 is a rear perspective view illustrating an automotive vehicle equipped with a convertible top having a fold-down rear window embodying the novel features of the invention.
Figure 5:
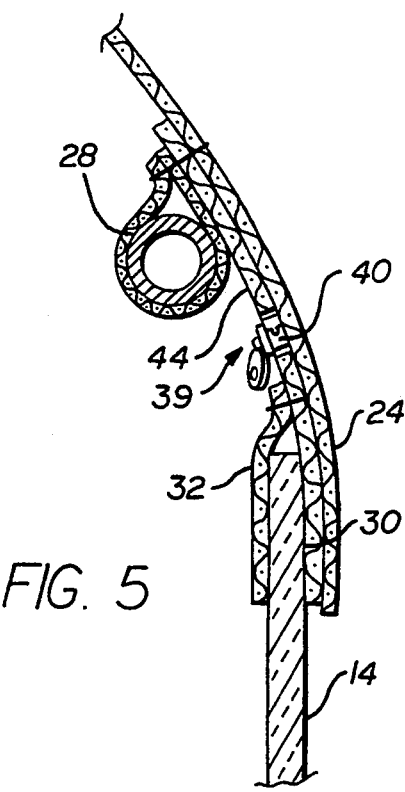
FIG. 5 is an enlarged fragmented vertical sectional view taken generally on the line 5—5 of FIG. 2.

As shown in the exemplary drawings, an improved convertible top referred to generally in FIG. 1 by the reference numeral 10 is provided for an automotive vehicle 12. The improved convertible top 10 includes a transparent rear window 14 of automotive safety glass or the like and having a substantial unobstructed surface area to provide high quality visibility to the rear of the vehicle. The convertible top is adapted for fold-down movement between an "up" or raised position shown in FIG. 1, and a highly compact "down" or lowered position (FIG. 8). The rear window 14 is connected to the top 10 by a track linkage 16 (FIG. 8) which permits the window to pivot within a plane independent of flexible portions of the top.

Figure 6:
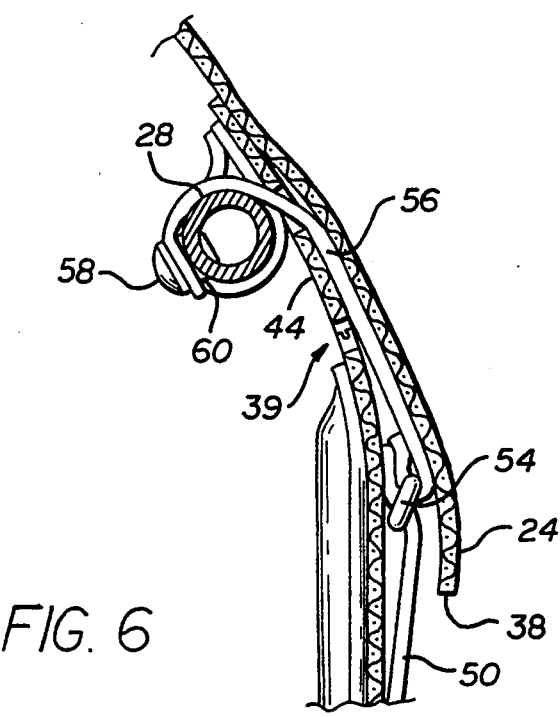
FIG. 6 is a fragmented perspective view showing a portion of the convertible top from within the vehicle, and illustrating the top and rear window in a partially folded state.
Figure 4:
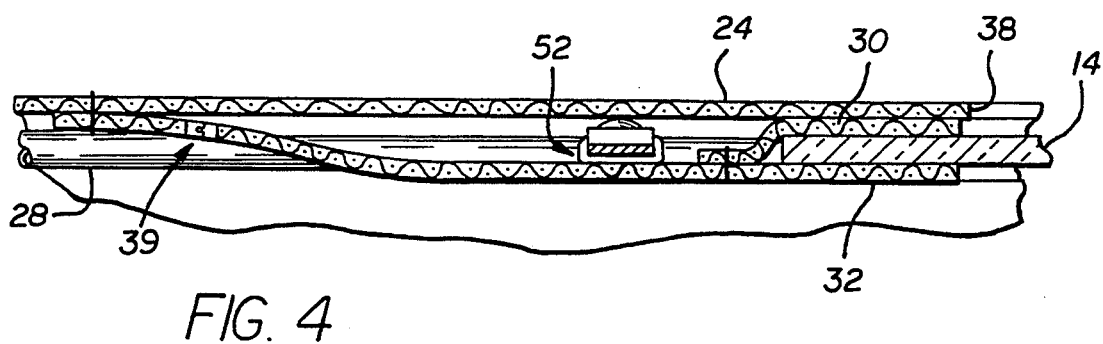
FIG. 4 is an enlarged fragmented horizontal sectional view taken generally on the like 4—4 of FIG. 2.

The improved convertible top 10 is designed particularly for use with relatively small and compact vehicles, such as roadsters and sports cars and the like, wherein minimal storage space is available to receive and store the convertible top 10 in the lowered position. In this regard, the convertible top 10 conventionally comprises a fold-down frame 18 which carries a flexible fabric-based top material 20. In a normal raised position as viewed in FIG. 1, the frame 18 supports and stretches the top material to form a roof structure over a vehicle passenger compartment, with releasable latches (not shown) being typically provided at the upper corners of a windshield frame to lock the top in the raised position. The frame 18 is designed for fold-down movement and storage in a collapsed state within a shallow storage well 22 (FIGS. 6 and 8) located typically at a position behind occupant seats within the vehicle passenger compartment.

The rear window 14 is provided within a rear panel 24 of the convertible top, wherein this rear panel 24 is defined by the stretch of fabric top material connected between a lower rear edge 26 of the convertible top and a rearmost frame bow 28 of the fold-down frame 18. In this regard, the rear bow 28 is shown with a conventional U-shaped geometry to extend upwardly and angularly rearwardly, and transversely across the vehicle when the top is in the raised position. In compact vehicles, to achieve a substantially optimized compact profile of the convertible top 10 in the lowered position, the fold-down frame 18 is normally designed to fold or flex the rear panel 24 upon itself. The track linkage 16 supports the rear window 14 at the inboard side of the rear panel 24 for folding movement of the window 14 relative to the rear panel 24 as the convertible top 10 is raised and lowered. With this construction, the rear window 14 of inflexible material such as glass can be designed with a relatively large surface area, thereby providing substantially optimum rearward visibility, while permit flex-folding of the rear panel 24 to a highly compact state in the lowered position.

As shown in FIGS. 2-7, the rear window 14 comprises a glass pane of tempered automotive safety glass or the like, formed with a substantially planar configuration, or otherwise formed with a slight arcuate curvature to accommodate the shape of the convertible top 10 in the raised position (FIG. 1). The peripheral margin of the glass pane is secured as by a suitable adhesive between a pair of trim strips 30 and 32 which may be formed from a fabric-based material similar to the top material 20. The trim strip 30 extending along a lower margin of the window 14 is attached by a seam 34 or the like to the rear panel 24 along a lower edge 36 of a rear window opening 38 formed in the rear panel 24. This stitched seam 34 provides a hinged connection between the lower margin of the window 14 and the rear panel 24, thereby allowing the rear window 14 to pivot to and from a plane substantially coplanar with the rear panel.

The upper margin of the rear window 14 is releasibly connected to the rear panel 24 at an inboard side thereof by an appropriate fastener such as a zipper 39. More particularly, the upper edge of the trim strip 30 carries a zipper segment 40 which may, as shown in the illustrative drawings, continue downwardly along the laterally opposed side edges of the window. The zipper segment 40 is positioned for connection with a mating zipper segment 42 formed on the lower edge of a zipper flap 44 mounted at or near the top of the rear panel 24 on an inboard surface thereof. The zipper flap 44, and the associated zipper segment 42, thus extend along the transversely opposite sides of the rear panel, and laterally across the rear panel near an upper edge 46 of the rear window opening 38. Conveniently, the zipper segment 42 is disposed at least slightly above the upper edge 46 of the rear window opening 38, so that the zipper is concealed from external view and also protected against direct exposure to rain and other forms of precipitation. A zipper pull 48 is provided for releasibly attaching the zipper segments 40, 42, thereby securely fastening the upper margin of the rear window 14 to the rear panel 24.

The track linkage 16 comprises a pair of elongated track straps 50 mounted at the laterally opposed sides of the rear window 14, as by stitched connection (FIG. 8) of opposite ends of each track strap to the trim strips 30, 32 near the upper and lower margins of the rear window. Each track strap 50 is associated with a slide member 52, shown in the form of a buckle 54 mounted on the associated strap 50 for sliding movement thereon. The buckle 54 is in turn attached by a short guide strap 56 to the rear panel 24 at a position located at or near the upper edge thereof. The illustrative drawings show this connection in the form of a snap button 58 on the guide strap 56, wherein the guide strap is looped behind the zipper flap 44 and over the rear bow 28 for releasibly connecting the snap button 58 to a snap base 60 mounted on the rear bow.

Figure 2:
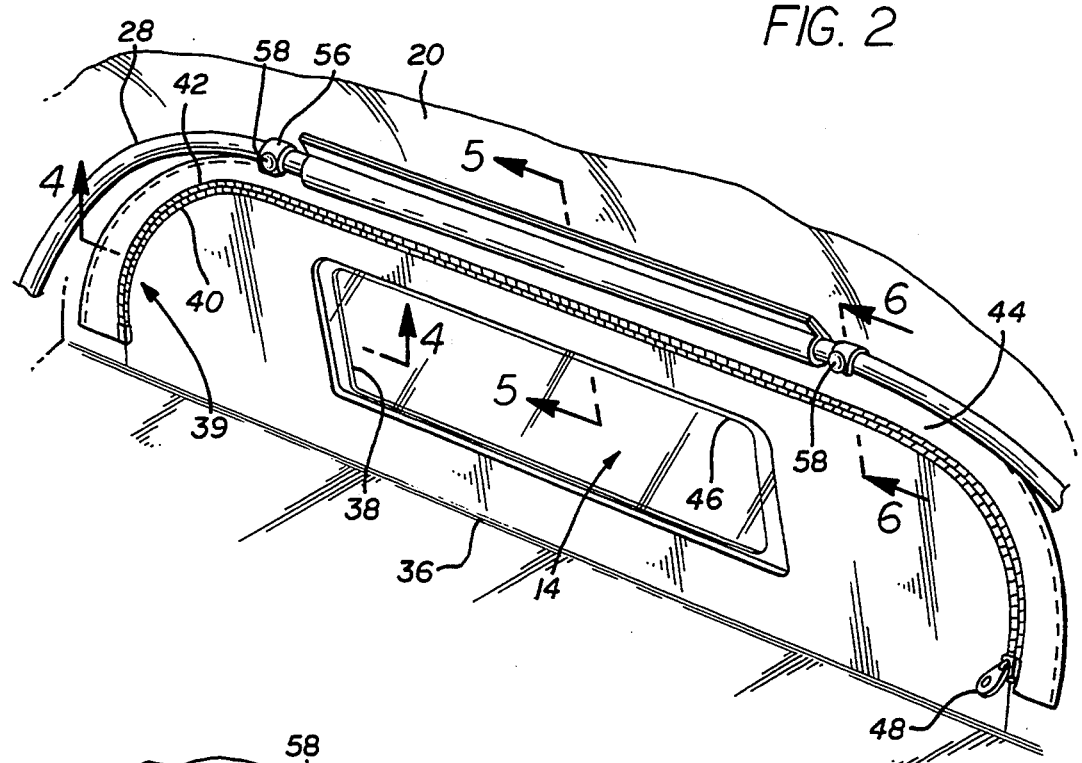
FIG. 2 is an enlarged fragmented perspective view showing a portion of the convertible top and rear window, as viewed from within the vehicle, and illustrating the convertible top in the raised position.
Figure 3:
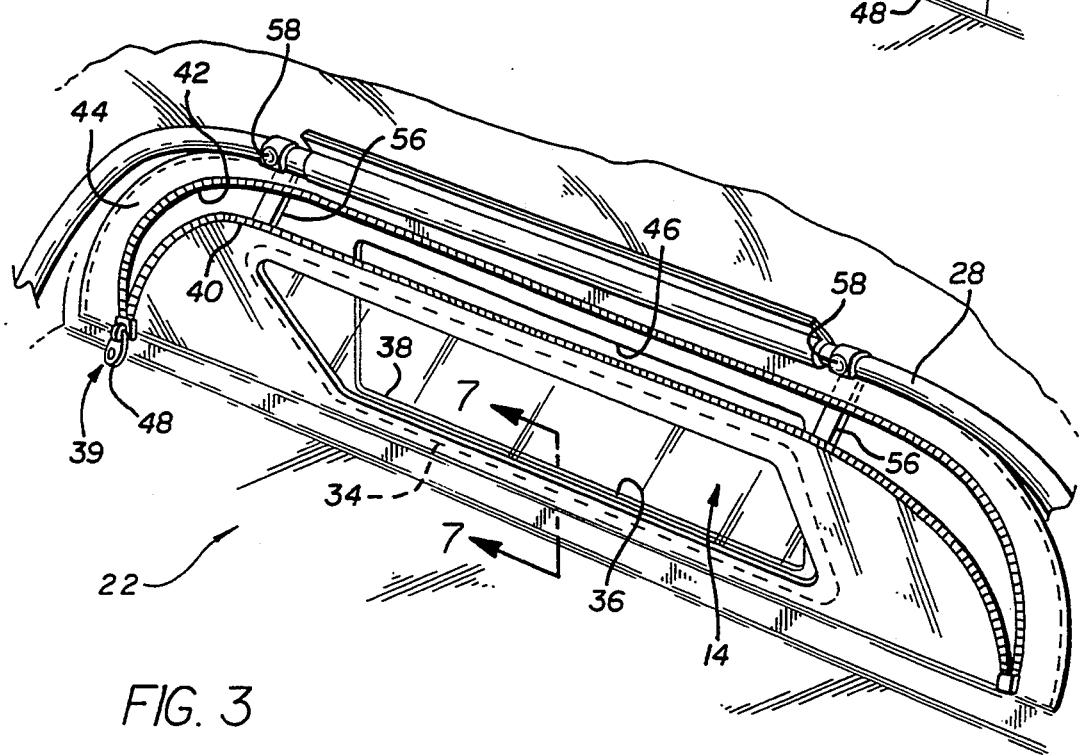
FIG. 3 is an enlarged fragmented vertical sectional view taken generally on the line 3—3 of FIG. 2.

In operation, the slide members 52 guide along the track straps 50 to control fold-down movement of the rear window 14, as the convertible top 10 is raised and lowered. More specifically, as shown in FIG. 2, the zippered connection between the upper margin of the window 14 and the top 10 is released preparatory to moving the convertible top 10 from the raised position to the lowered position. With the zipper 39 released, the convertible top 10 is folded in a normal manner to collapse the fold-down frame and top material 20 thereon into a compact state nested within the storage well 22. As the frame 18 is folded, the buckles 54 on the guide straps 56 transition along the track straps 50 (FIGS. 5 and 8) from the upper ends to the lower ends thereof, thereby allowing the rear window 14 to pivot on the hinge seam 34 in a forward and downward direction to a folded and stored position lying upon a deck 62 of the storage well 22. Conveniently, as shown in FIG. 8, the rear window 14 is nested between a pair of raised stops 64 mounted on the deck 62 to underlie the folded frame components of the top 10, such that the weight of the folded convertible top is not rested upon the glass rear window 14.

Reverse movement of the convertible top 10 from the lowered position to the raised position is accompanied by upward swinging movement of the rear window 14 to a deployed position extending across and substantially closing the rear window opening 38 in the rear panel 24. That is, upward motion of the frame 18 displaces the rear bow 28 in a direction lifting the guide straps 56 and associated slide buckles 54. The buckles 54 thus guide in an upward direction along the track strap 50 thereby lifting the rear window 14 to the deployed position. Final closure of the rear window is achieved by reclosing the zipper 39.

In accordance with one aspect of the invention, the slide members 52 can be detached from the convertible top 10, thereby permitting movement of the top between the raised and lowered positions, without corresponding movement of the rear window 14 between the deployed and stored positions. Such detachment is achieved by disconnecting the snap buttons 58 from the rear bow 28. This permits the rear window 14 to pivot downwardly to the stored position lying upon the rear deck 62 between the raised stops 64 (FIG. 8). With the upper margin of the rear window 14 detached from the top 10 in this manner, the convertible top 10 may remain in the raised position, in which case the rear window opening 38 in the rear panel 24 is open to unobstructed air flow. The convertible top may be raised and lowered as desired with the rear window 14 detached from the rear bow 28.

The improved convertible top of the present invention thus provides a glass rear window 14 of substantial surface area to achieve high quality rearward visibility, when the top 10 is in the normal raised position. When the top 10 is moved to the lowered position, the track linkage between the rear panel 24 and the rear window 14 permits fold-down movement of the window within a plane which is independent of the rear panel. Thus, the convertible top 10 may be configured for fold-down movement to a highly compact configuration, with the rear panel 24 folded upon itself, while still providing a relatively large and inflexible rear window having high quality optical characteristics.

A variety of further modifications and improvements to the improved convertible top 10 of the present invention will be apparent to those skilled in the art. Accordingly, no limitation on the invention is intended by way of the foregoing description and accompanying drawings, except as set forth in the appended claims.

What is claimed is:

1. A convertible top assembly for an automotive vehicle, comprising:
   a convertible top including a fold-down frame for movement between a raised position and a lowered position, said frame carrying a flexible top material defining a rear panel having a rear window opening formed therein;
   a rear window;
   hinge means for hingedly connecting a lower margin of said rear window to said rear panel at a location extending generally along a lower edge of the rear window opening, whereby said rear window is pivotally movable relative to said rear panel; and
   track linkage means slidably connecting said rear window to said top at a position generally adjacent to an upper edge of the rear window opening for guiding said rear window, in response to movement of said frame between said raised and lower positions, between a deployed position covering and closing said rear window opening when said frame is in the raised position, and a stored position when said frame is in the lowered position, said rear window in said stored position being disposed in nonplanar relation to said rear panel;
   said track linkage means including a pair of track members at the laterally opposite ends of said rear window and extending generally between upper and lower edges of said rear window, and a pair of slide members connected to said top generally adjacent to the upper edge of the rear window opening at laterally opposite ends thereof, said slide members being slidably connected respectively to said track members.

2. The convertible top assembly of claim 1 wherein said rear window comprises a glass pane.

3. The convertible top assembly of claim 1 wherein said rear window comprises a substantially rigid transparent pane.

4. The convertible top assembly of claim 1 wherein said slide members are detachable from said top, so that said frame can be raised and lowered with said rear window remaining in said stored position.

5. The convertible top assembly of claim 1 wherein the vehicle includes a storage well for receiving said top when said frame is in the lowered position, and further including a pair of raised stops within said storage well for supporting said frame in the lowered position, said rear window being positioned between said raised stops when said rear window is in the stored position.

6. The convertible top assembly of claim 1 further including means for releasibly connecting said rear window generally along an upper margin thereof to said rear panel generally along an upper edge thereof when said frame is in the raised position.

7. The convertible top assembly of claim 6 wherein said releasible connecting means comprises a zipper.

8. A convertible top assembly for an automotive vehicle, comprising:
   a convertible top including a fold-down frame for movement between a raised position and a lowered position, said frame carrying a flexible top material, said frame and top material defining a roof structure for the vehicle when said frame is in the raised position and being received within a storage well of the vehicle when said frame is in the lowered position;
   said frame including a rear bow extending transversely across the vehicle, a portion of said top material being connected between said rear bow and a rear edge of said top to define a rear panel having a rear window opening formed therein;

a rear window including a substantially rigid and transparent window pane, and flexible trim strip means connected to said pane and extending around the periphery thereof;

hinge means for connecting a lower margin of said rear window to said rear panel for pivoting movement of said rear window about an axis extending generally along a lower edge of said rear window opening;

a pair of track members mounted on said rear panel generally at laterally opposite ends of said pane, said track members extending generally between upper and lower margins of said rear window; and a pair of slide members connected to said top generally at laterally opposite ends of the rear window opening and adjacent to an upper edge of the rear window opening, said slide members being respectively and slidably coupled with said track members for guiding said rear window between a deployed position covering the rear window opening and a stored position lying within the storage well in nonplanar relation to said rear panel, in response to movement of said frame between the raised and lower positions.

9. The convertible top assembly of claim 8 wherein said rear window comprises a substantially rigid transparent pane.

10. The convertible top assembly of claim 8 wherein said hinge means comprises a sewn seam interconnecting said trim strip means with said rear panel.

11. The convertible top assembly 8 wherein said track members comprise a pair of straps having opposite ends connected to said trim strip means.

12. The convertible top assembly 11 wherein said slide members include a pair of buckles slidably mounted on said straps.

13. The convertible top assembly of claim 8 wherein said slide members are detachable from said top, so that said frame can be raised and lowered with said rear window remaining in said stored position.

14. The convertible top assembly of claim 8 further including a pair of raised stops within said storage well for supporting said frame in the lowered position, said rear window being positioned between said raised stops when said rear window is in the stored position.

15. The convertible top assembly of claim 8 further including means for releasibly connecting said rear window generally along an upper margin thereof to said rear panel generally along an upper edge thereof when said frame is in the raised position.

16. The convertible top assembly of claim 15 wherein said releasible connecting means comprises a zipper.

17. The convertible top assembly of claim 8 wherein said slide members are releasibly connected to said rear bow.

* * * * *